April 3, 1956     D. M. MORGENSTERN     2,740,329
REMOTELY ADJUSTABLE REAR VIEW MIRROR
Filed July 26, 1952     2 Sheets-Sheet 1

INVENTOR.
DAVID M. MORGENSTERN
BY
Brennan B. West
ATTORNEY

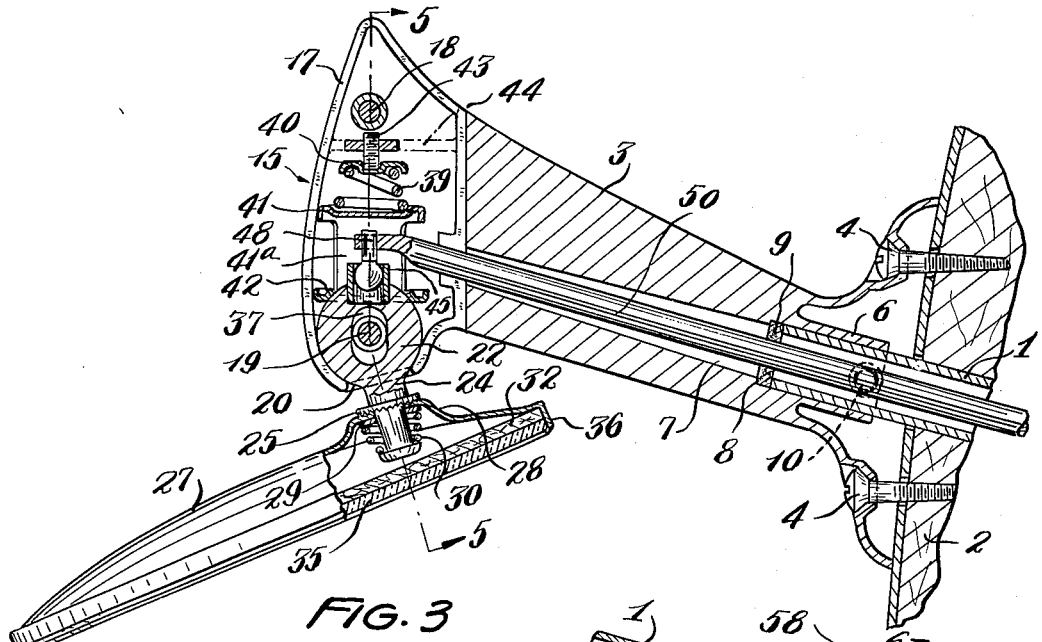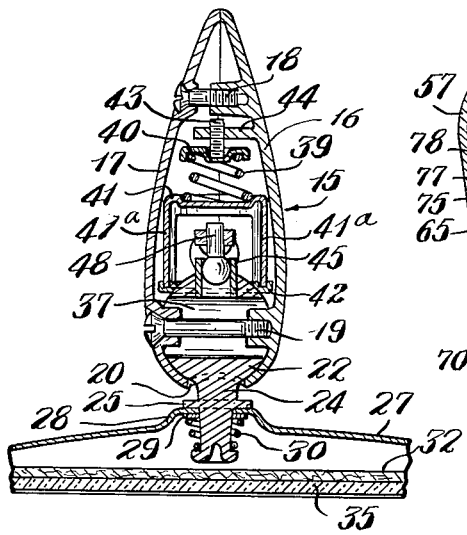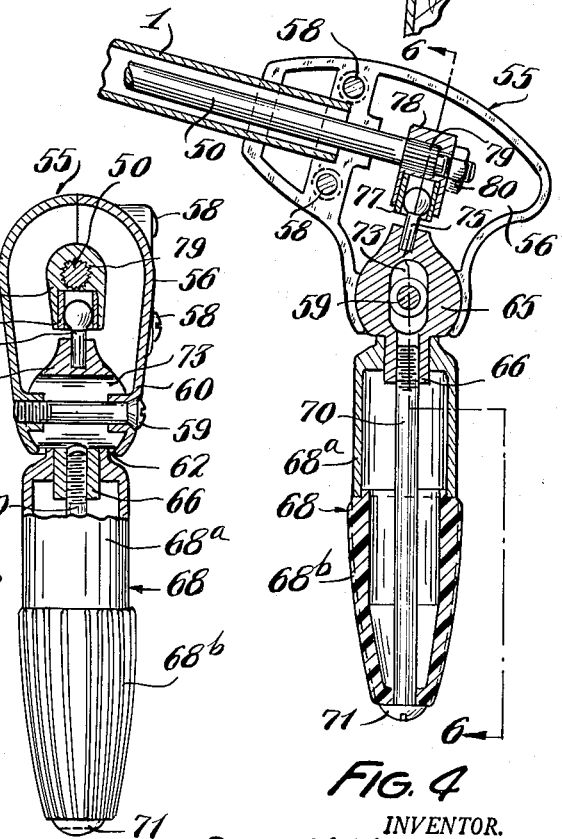

United States Patent Office 2,740,329
Patented Apr. 3, 1956

2,740,329

REMOTELY ADJUSTABLE REAR VIEW MIRROR

David M. Morgenstern, Euclid, Ohio, assignor to Nelmore Corporation, Chicago, Ill., a corporation of Illinois Application July 26, 1952, Serial No. 301,139

14 Claims. (Cl. 88—93)

This invention relates to that class of automotive vehicle accessories or devices known as rear view mirrors, and particularly to the remotely adjustable type of such accessories or devices, wherein the mirror is mounted exteriorly of the vehicle and the means for adjusting the mirror to different angles is located inside the vehicle in convenient reach of the driver.

Among the objects of the invention are to provide a device of the aforesaid type that is simple of construction and relatively inexpensive; to provide a device of said type that is neat and attractive in appearance—desirably of streamline design; to provide a remotely adjustable rear view mirror that may be easily and quickly installed on a vehicle; that is substantial and durable; that is especially easy to manipulate for the purpose of changing the angle of the mirror; wherein the mirror effectively retains any position to which it is adjusted against accidental displacement from vibration, and wherein the position of the handle in relation to the remainder of the device may be readily changed to insure maximum convenience to the user.

Another object of the invention is to provide a device of the aforesaid character that is composed of relatively few parts designed to expedite and facilitate assembly.

Further objects and advantages will appear as I proceed to describe the invention by reference to the accompanying drawings wherein like parts are designated by like reference characters throughout the several views.

In the drawings,

Fig. 3 is a horizontal section through the mirror supporting arm and the adjacent portion of the mirror back;

Fig. 4 is a substantially horizontal section through the inner end of the device, showing the operative connections between the handle and the mirror adjusting rod;

Fig. 5 is a section on the line 5—5 of Fig. 3, and

Fig. 6 is a section substantially on the line 6—6 of Fig. 4.

Figure 1:
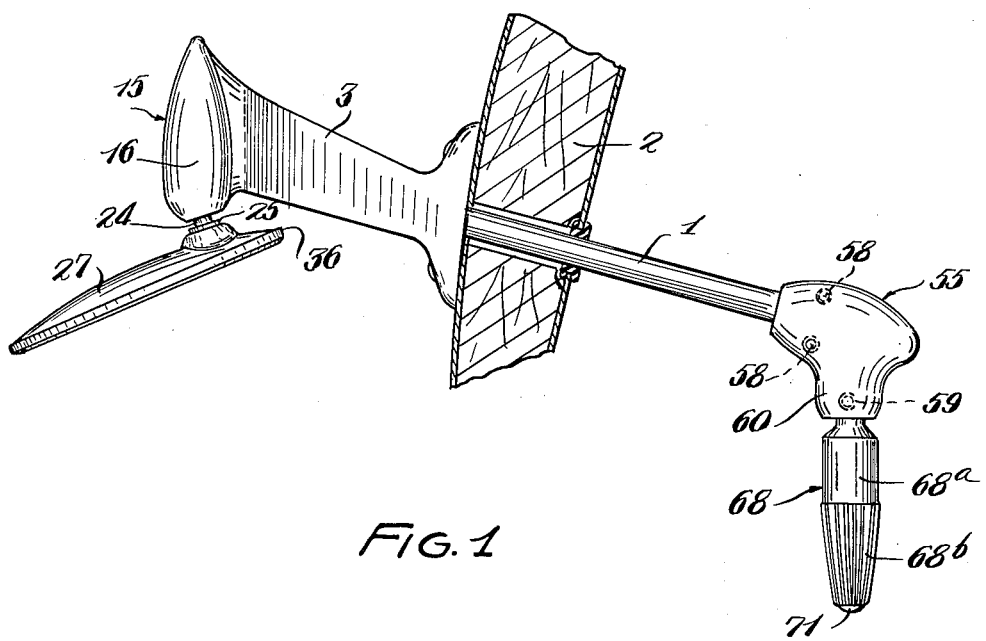
Fig. 1 is a plan view of my improved rear view mirror device as it would appear from above when installed in an automotive vehicle.
Figure 2:
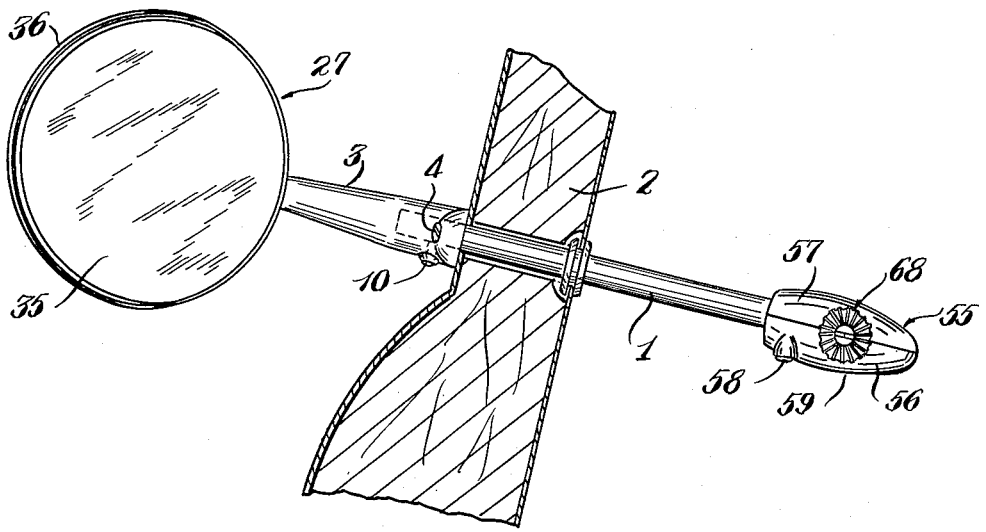
Fig. 2 is a rear elevational view of the same.

A tube 1 extends through a hole in the wall 2 of the vehicle. Applied to the outer end of said tube and to the exterior of the wall 2 is a mirror supporting arm 3. This arm is desirably a die casting, and is held to the wall by screws 4. The arm is flared from front to rear at its inner end or base where it is shown as hollow and as provided with an internal boss 6 (Fig. 3). The arm has a longitudinal bore 7 that is enlarged and is cylindrical where it extends axially through the boss 6, the bore being shown as tapering toward its outer end from a shoulder 8 that defines the outer end of the cylindrical portion of the bore. A washer 9 of suitable material is disposed between said shoulder and the outer end of the tube 1 that fits within the boss 6. Said tube is held against withdrawal from the boss 6 by a set screw 10 that is threaded through the underside of the arm, as best shown in Fig. 2.

The arm 3 terminates at its outer end in a tear-shaped head that is designated generally by the reference numeral 15. The arm is designed with the view of having the axis of the head approximately horizontal, and parallel with the longitudinal center of the vehicle, when the device is installed. The head 15 is hollow and is composed of two halves or shells designated 16 and 17, the former being integral with the arm. Said shells are held together by screws 18 and 19. The head 15 is disposed with its larger end to the rear, and is provided with an opening 20 at its rear end. The internal surface of the wall of the head adjacent the opening 20 is of spherical contour, thus to provide a bearing surface of appropriate shape to receive a ball 22. A stud 24 projects from the ball 22 through the opening 20 and is provided intermediate its ends with a collar 25. 27 denotes the mirror back or casing which may be made of sheet metal. It is formed with a boss 28, desirably off center with respect to the back or casing 27 that is shown as circular, said boss having an aperture through which the stud 24, rearwardly of the collar 25 is projected. The contacting surfaces of said boss and collar are desirably provided with complementary serrations to better retain them against accidental relative movement. A washer 29, preferably of fiber, is shown as engaged with the inner side of the apertured wall of the boss, and a conical spring 30 is compressed between said washer and the turned over inner end of the stud. Following the usual practice, the back or casing 27 includes an annular seat adjacent its edge by which a disc or gasket 32 and a mirror 35 are supported. The mirror 35 and washer or gasket 32 are held within the back or casing by the inwardly turned edge of a peripheral flange 36 of said back or casing. The washer or gasket 32 desirably consists of asphalt impregnated felt. By reason of the construction described, the mirror may be adjusted about the axis of the stud 24 to change its elevation and its spacing from the vehicle wall. The ball 22 has a slot 37 through which the previously mentioned screw 19 extends, the width and length of the slot relative to the diameter of said screw affording ample movement of the ball 22 with respect to its seat for all practical purposes.

The ball 22 is held against its seat by a spring 39, with sufficient friction to insure its retaining any position to which it is moved, against vibration. Said spring is compressed between an abutment 40, desirably in the form of an adjustable spring seat, and the dished inner end of a sheet metal spacer 41, having diametrically opposed legs 41a that bear, at their forward ends, against an annular thrust member 42. The inner edge portion of this member 42 conforms to the contour of and bears against the ball 22. It is evident, therefore, that the pressure of the spring 39 is transmitted to the ball 22, for holding the latter against its seat, through the intervention of the spacer 41 and the thrust member 42. In the present instance, the abutment or spring seat 40 is sustained by an adjusting screw 43 that is threadedly engaged in an aperture in a transverse wall portion 44 of the shell 16.

The side of the ball 22 remote from the stud 24 is provided with a recess into which is pressed a sleeve 45 of suitable metal. Operating within the sleeve 45 is the spherical head of a pin 48. This pin is secured to and projects laterally from the flattened outer end of a rod 50 that extends through the bore 7 of the arm 3 and through the tube 1. A handle support, designated generally by the reference numeral 55, is secured against rotation to the inner end of the tube 1. Said support is hollow, and is composed of two halves or shells designated 56 and 57, each desirably consisting of a die casting. The two halves or shells are secured together by two screws designated 58, and a third screw 59. The latter screw binds together extensions of the shells 56 and 57 that constitute a lateral branch 60 of the support 55. Said lateral branch has an opening 62 at its rear end, and the internal surface of the wall of the support adjacent the opening 62 is of spherical contour, thereby to provide a bearing surface or seat of proper shape to receive a ball 65. The ball has a rearwardly extending hollow boss 66 that is internally threaded. Over the boss is engaged the apertured forward end of a handle designated generally by the reference numeral 68. The handle is shown as composed of front and rear sections 68a and 68b, respectively, the former desirably consisting of a die casting of suitable metal. The section 68b may consist of a die cast plastic member that has its forward end shaped for interengagement with the rear end of the section 68a, and axially through these parts is projected a screw 70 that is threaded into the boss 66 and has a head 71 that engages the rear end of the handle section 68b. The ball 65 has a slot 73 through which the screw 59 extends, the slot being sufficiently long and enough wider than the diameter of said screw to permit the ball to be rocked upon the surrounding seat in different directions. Obviously, the pressure or friction between the ball 65 and its seat may be increased or decreased by appropriate adjustment of the screw 59.

A pin 75 is secured to and projects forwardly from the ball 65 and has a spherical head that operates within a sleeve 77, pressed into a rearwardly opening recess of an arm 78. The arm 78 has a bore that receives the rear end of the previously mentioned rod 50. Said rod has a circumferential portion 79 that is serrated and is received by a complementary part of the bore of the arm 78, the rod having an axial extension that projects through a smooth part of the bore and is threaded therebeyond to receive a nut 80 by which the arm is secured to the rod. The shells 56 and 57 of the support 55 have internal parts shaped to provide opposed seats between which the inner end of the tube 1 is adapted to be firmly clamped, and adjacent the seats said parts are formed to provide a bearing for the rod 50. A similar bearing is provided in the arm 3 where the rod 50 projects into the hollow head 15. The rod is reciprocable and rotatable in said bearings.

With the device constructed as described, and installed on a motor vehicle in the manner set forth, the driver may assume a comfortable driving position and then, by means of the handle 68, adjust the mirror 35 until it directly reflects to him a view to the rear of the vehicle. When the driver shifts his position to avoid fatigue, as when touring, or changes it for any other reason, he may conveniently readjust the mirror to suit the circumstances. Also, under changing traffic conditions it sometimes becomes desirable to change the angle of the mirror. This may be quickly, safely, and conveniently accomplished by a movement of the handle in precise accord with the required adjustment of the mirror. By reason of the nature of the operative connection between the handle and the mirror, the movements of the handle and mirror correspond in all respects. When the handle 68 is swung in a lateral direction, for instance, its movement is transmitted through the ball 65, pin 75 and arm 78 to the rod 50, to shift the rod longitudinally in its bearings. This movement of the rod is transmitted through the pin 48 at the outer end of said rod to the ball 22 to adjust it, and consequently the mirror 35, in accord with the movement of the handle. When the handle is swung in a vertical direction—upwardly, for example—it will depress the head of the pin 75 thereby to rock the adjacent end of the arm 78 downwardly and through the consequential rotation of the rod 50, depress the head of the pin 58 and rock the ball 22 in a direction to lift the stud 24 and pitch the mirror at an angle corresponding to that of the handle.

While the parts are illustrated in the drawings as though the handle 68 were in the same horizontal plane as the mirror carrying stud 24, an important feature of the invention resides in the adjustability of the handle about the axis of the tube 1. In some instances it may extend directly, or generally, downward from the tube in order to meet the requirements of a particular driver; or it may extend rearwardly, as indicated in the drawing, or upwardly. To effect such an adjustment, the screws 58 and 59 are withdrawn, and the opposed shells of the handle support casing 55 are removed from the tube 1. The nut 80 may then be unscrewed from the rear end of the rod 50 and the arm 78 taken off and turned so that it will extend from the axis of the rod in the direction to which it is desired to adjust the handle. The arm is then reengaged with the serrated portion 79 of the rod and the nut is applied and drawn up tightly to secure the arm in its new position. The casing 55 is now reassembled with the ball 65 in place and with the head of the pin 75 in the sleeve 77 of the arm 78, it being understood that the plane of separation between the shells of the casing 55 is approximately coincident with the radial axis of the arm 78. The screws 58 and 59 are now replaced to hold the parts in assembled condition, with the inner end of the tube 1 firmly clamped between the casing shells.

Another important characteristic of my invention is the manner of mounting the mirror carrying element and the handle for universal movement, presently effected through the ball-and-socket mountings of these parts. This enables the mirror to be instantly pointed in any desired direction by a swift, continuous movement of the handle in a single plane.

While I have described the device herein as applied to a wall of a vehicle body, it is to be understood that the term "wall" is used in a broad sense to include a door, for example, or any other part of the vehicle body that would properly serve as a support for the device. I may also explain that, because of its nature, I have described in certain of the claims, in approximately the following terms, the operative connection between each of the balls 22 and 65 and the corresponding arm on the rod 50 as a "constantly effective telescoping driving connection that affords relative universal movement between the parts connected." Also, because of its analogy to a gear drive when the rod 50 is rotated, and to a rack and pinion drive when the rod is moved lengthwise, I employ in some of the claims the terms "intermeshing motion transmitting" in defining the operative connections between the rod and mirror and between the rod and handle.

Having thus described my invention, what I claim is:

1. A rear view mirror device comprising a rigid supporting structure of fixed length for installation in a vehicle with the outer end of said structure outside, and the inner end thereof inside, the vehicle, means for fastening the structure to the vehicle against all movement with respect to the latter, a mirror pivotally connected to the outer end of the structure for oscillation relative thereto in substantially vertical and horizontal planes, a handle pivotally connected to the inner end of said structure for swinging movement relative thereto in similar planes, a rod supported by the structure for longitudinal and rotary motion with respect to the structure, intermeshing motion transmitting connections between the outer end of the rod and the mirror, and similar motion transmitting connections between the inner end of the rod and the handle whereby, when the handle is swung on its pivot in a substantially vertical plane the rod will be rotated and impart movement to the mirror similar to that of the handle, and when the handle is swung on its pivot in a substantially right angular plane the rod will be moved longitudinally and transmit motion to the mirror similar to that of the handle.

2. A rear view mirror device comprising a rigid supporting structure for installation in a vehicle with the outer end of said structure outside, and the inner end thereof inside, the vehicle, means for fastening the structure to the vehicle against all movement with respect to the latter, a mirror carrying element pivoted to the outer end of the structure, a handle carrying element pivoted to the inner end of said structure, each for swinging movement relative to the structure in planes at substantially right angles to each other, a rear view mirror carried by the first mentioned element rearwardly of its pivotal connection with said structure, a handle on the rear end of the second mentioned element, a rod supported by the structure for reciprocation and oscillation with respect thereto, intermeshing connections between the forward end of the handle carrying element and the inner end of the rod through which rotary motion is transmitted to the rod when the handle is swung in a substantially vertical plane and through which the rod is moved endwise when the handle is swung in a substantially right angular plane, and intermeshing connections between the outer end of the rod and the mirror carrying element through which rotation of the rod is transmitted to said element to swing it in a substantially vertical plane and through which endwise movement of the rod causes said element to be swung in a substantially horizontal plane.

3. A rear view mirror device comprising an arm that is adapted to be attached to a vehicle wall on the outer side thereof, means for fastening the arm to the vehicle wall against all movement with respect thereto, a mirror connected to the arm for adjustment relative thereto about substantially vertical and horizontal axes, a tube adapted to be projected through a hole in the vehicle wall, the same extending inwardly from the arm, the arm having a bore registering with that of the tube, a handle support at the inner end of the tube in fixed relation to the arm, a handle connected to the support for swinging movement relative thereto in substantially vertical and lateral directions, a rod extending through the tube and arm and supported for reciprocation and rotation, intermeshing motion transmitting connections between the inner end of the rod and the handle, and similar motion transmitting connections between the outer end of the rod and the mirror whereby, upon movement of the handle, like movement is transmitted to the mirror.

4. A rear view mirror device comprising an arm that is adapted to be attached to a vehicle wall on the outer side thereof, means for fastening the arm to the vehicle wall against all movement with respect thereto, a mirror sustaining element pivotally connected to the outer end of the arm for swinging movement relative to the arm in substantially vertical and horizontal planes, a mirror attached to the rear end of said element for movement therewith, a tube adapted to be projected through a hole in the vehicle wall and secured in fixed relation to and extending inwardly from said arm, the arm having a longitudinal bore registering with that of the tube, a handle support at the inner end of the tube in fixed relation thereto, a handle carrying element having pivotal connection with said support for swinging movement in substantially vertical and lateral directions, a handle secured to the inner end of the last mentioned element, a rod extending through said tube and arm and supported for rotary and longitudinal movement, parts on the rod extending laterally therefrom and generally toward said elements, each element being provided with a forwardly extending part having intermeshing motion transmitting connection with the corresponding rearwardly extending part on the rod, whereby, upon movement of the handle, like movement is transmitted to the mirror.

5. A rear view mirror device comprising an arm that is adapted to be attached to a vehicle wall on the outer side thereof in line with a hole through said wall, means for fastening the arm to the vehicle wall against all movement with respect thereto, said arm incorporating at its outer end a forwardly facing ball seat, a ball engaged with said seat for rocking movement thereon, a mirror attached to and movable with the ball, a handle supporting structure adapted to be located on the inner side of the wall in fixed relation to the arm, said structure including a similarly facing ball seat, a ball engaged with said seat, a handle connected to the ball for rocking the same, a rod, the arm and said structure having bearings wherein the opposite end portions of the rod are supported in such manner that the rod is capable of rotary and longitudinal movement, and an operative connection between each ball and the adjacent end of the rod comprising a part on the side of each ball nearest the rod and an opposed part on the corresponding end of the rod and extending toward the part on the ball, the adjacent ends of opposed parts having a constantly effective telescoping driving connection with each other that affords relative universal movement between the parts, whereby, upon movement of the handle, like movement is transmitted to the mirror.

6. A rear view mirror device comprising an arm that is adapted to be rigidly attached to a vehicle wall on the outer side thereof, said arm terminating at its outer end in a hollow head provided at its rear end with an opening and on its interior with a forwardly facing annular ball seat surrounding said opening, a ball engaged with said seat, a mirror, connections between the mirror and ball extending through said opening, a compression spring arranged within the head for retaining the ball in frictional contact with the seat, a tube adapted to be projected through a hole in the vehicle wall and secured at its outer end to said arm, the arm having a longitudinal bore registering with the bore of the tube, a handle support adjacent the inner end of the tube in fixed relation to the arm, a handle pivotally connected to said support for swinging movement relative thereto in substantially vertical and lateral directions, a rod extending through the tube and arm and supported for reciprocation and rotation, operative connections between the handle and the inner end of the rod, the outer end of the rod projecting beyond the bore of the arm into said hollow head, and operative connections between the aforesaid ball and the adjacent end of the rod.

7. A rear view mirror device according to claim 6, wherein the bore of the arm is enlarged adjacent its inner end for the reception of the outer end of said tube and to provide a shoulder in opposed relation to the adjacent end surface of the tube, and a washer interposed between the shoulder and tube and through the opening whereof the said rod extends.

8. A rear view mirror device according to claim 6, wherein the hollow head is composed of two shells that separate in a plane coincident with the center of the ball and the axis of said rod, one of said shells being integral with the arm, and screws securing the shells together, the axes of said screws being substantially normal to the aforesaid plane, the ball having a diametrical opening through which one of said screws extends, the opening being of a size to provide considerable clearance about said screw.

9. A rear view mirror device comprising an arm that is adapted to be rigidly attached to a vehicle wall on the outer side thereof, said arm terminating at its outer end in a hollow head provided at its rear end with an opening and on its interior with a forwardly facing annular ball seat surrounding said opening, a ball engaged with said seat, a mirror, connections between the mirror and ball extending through said opening, the head enclosing an abutment spaced a substantial distance forwardly of and facing said seat, a compression spring arranged with its forward end engaging said abutment, spacing means interposed between said spring and the ball for retaining the latter in frictional contact with the seat, a tube adapted to be projected through a hole in the vehicle wall and secured at its outer end to said arm, the arm having a longitudinal bore registering with the bore of the tube, a handle support adjacent the inner end of the tube in fixed relation to the arm, a handle pivotally connected to said support for swinging movement relative thereto in substantially vertical and lateral planes, a rod extending through the tube and arm and supported for reciprocation and rotation, operative connections between the handle and the inner end of the rod, the outer end of the rod projecting beyond the bore of the arm into said hollow head, said spacing means having a cavity into which the latter end of the rod projects, and operative connections between the aforesaid ball and the adjacent end of the rod.

10. A rear view mirror device according to claim 9, wherein said spacing means is composed of a thrust ring that engages the ball, and a sheet metal member including a spring seat against which the rear end of the compression spring bears and provided with legs that extend forwardly from the region of the spring seat and bear against said thrust ring.

11. A rear view mirror device comprising an arm that is adapted to be rigidly attached to a vehicle wall on the outer side thereof, said arm terminating at its outer end in a hollow head provided at its rear end with an opening and on its interior with a forwardly facing annular substantially spherical bearing surface surrounding said opening, a ball engaged with said bearing surface, resilient means enclosed by the head for urging the ball into frictional engagement with said bearing surface, a stud projecting rearwardly from the ball through said opening, a mirror carried by the stud, a tube adapted to be projected through a hole in the vehicle wall and secured to the arm and extending inwardly therefrom, the arm having a longitudinal bore registering with the bore of the tube, a handle support casing at the inner end of the tube in fixed relation thereto, said handle support casing incorporating at its rear end an internal forwardly facing annular substantially spherical bearing surface and being provided at its rear end with an aperture the axis of which is surrounded by the second mentioned bearing surface, a ball engaged with said bearing surface for oscillation in substantially vertical and horizontal planes, a handle, a rigid connection between the handle and the last mentioned ball that is accommodated by said aperture, a rod extending through the aforesaid tube and arm, bearings incorporated in the arm and handle support casing wherein the rod is rotatable and endwise slidable, parts on the ends of the rod extending generally rearwardly therefrom, and parts on said balls that project generally forwardly from the latter in opposed relation to the parts on the rod, the forward end of said part on each ball having a constantly effective telescoping driving connection with the rear end of the corresponding part on said rod affording relative universal movement between said parts, whereby, upon movement of the handle, a corresponding movement is transmitted to the mirror.

12. A rear view mirror device according to claim 11, wherein said handle support casing is composed of two shells that meet in a plane substantially coincident with the center of the second mentioned ball and the axis of said tube, screws normal to said plane and connecting the shells together, said second mentioned ball having a diametrical opening through which one of the screws extends and which is of a size to provide considerable clearance about said screw, the shells having internal transverse walls recessed for the reception of the inner end of the tube and between which said end of the tube is clamped, said walls having beyond the end of the tube semicylindrical cavities of a radius suitable to provide a bearing wherein the inner end of said rod is rotatable and reciprocable.

13. A rear view mirror device according to claim 12, wherein the inner end of said rod projects inwardly of said bearing, an arm fixed to the inner end of the rod, said arm extending in a radial direction from the rod and having a cylindrical recess in the end thereof, a sleeve occupying said recess, and a pin carried by and projecting forwardly from the adjacent ball, said pin being provided with a spherical head having a working fit within said sleeve.

14. A rear view mirror device comprising a rigid supporting structure for installation in a vehicle with the outer end of said structure outside, and the inner end thereof inside, the vehicle, means for fastening the structure to the vehicle against all movement with respect to the latter, a mirror carrying element mounted in the outer end of said structure for universal movement with respect thereto, a handle mounted at the inner end of said structure for movement with respect to the structure, a rear view mirror carried by said element, a rod supported by the structure for reciprocation and oscillation with respect thereto, intermeshing motion transmitting connections between the outer end of the rod and the mirror carrying element, and operative connections between the handle and the inner end of the rod through which the rod may be reciprocated and rotated by means of the handle.

References Cited in the file of this patent

UNITED STATES PATENTS

| | | |
|---|---|---|
| 2,260,597 | Beattie | Oct. 28, 1941 |
| 2,281,234 | Clark et al. | Apr. 28, 1942 |
| 2,341,208 | Clark et al. | Feb. 8, 1944 |
| 2,456,362 | Aves | Dec. 14, 1948 |
| 2,570,536 | Fellabaum | Oct. 9, 1951 |
| 2,585,308 | Goldstein | Feb. 12, 1952 |
| 2,620,708 | Anderson | Dec. 9, 1952 |